May 10, 1927.
H. A. CHANDLER
1,627,833
CONVERTIBLE PASSENGER VEHICLE AND CASKET COACH
Filed Oct. 25, 1926
3 Sheets-Sheet 1
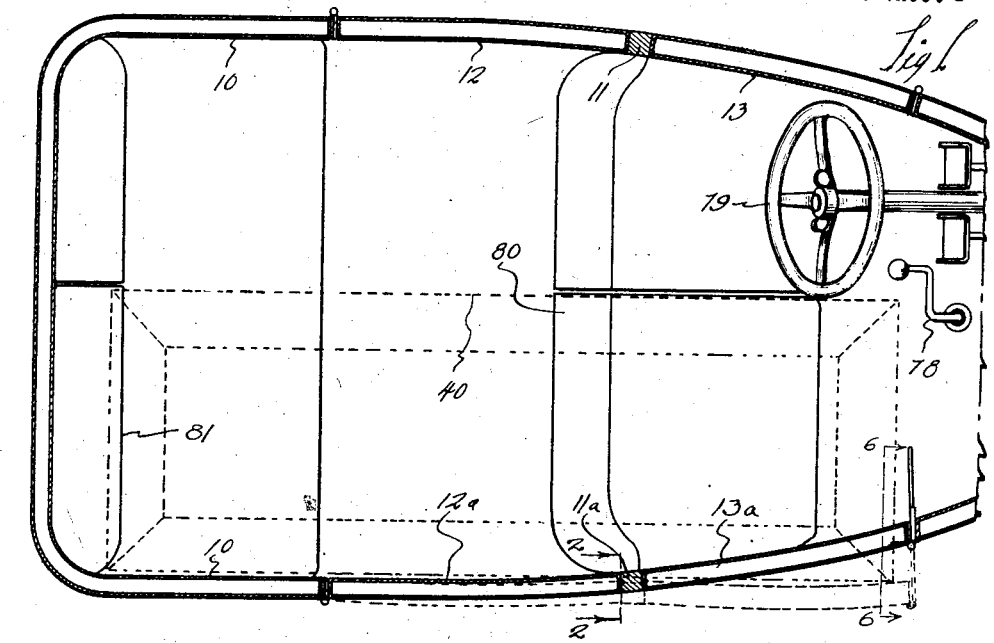
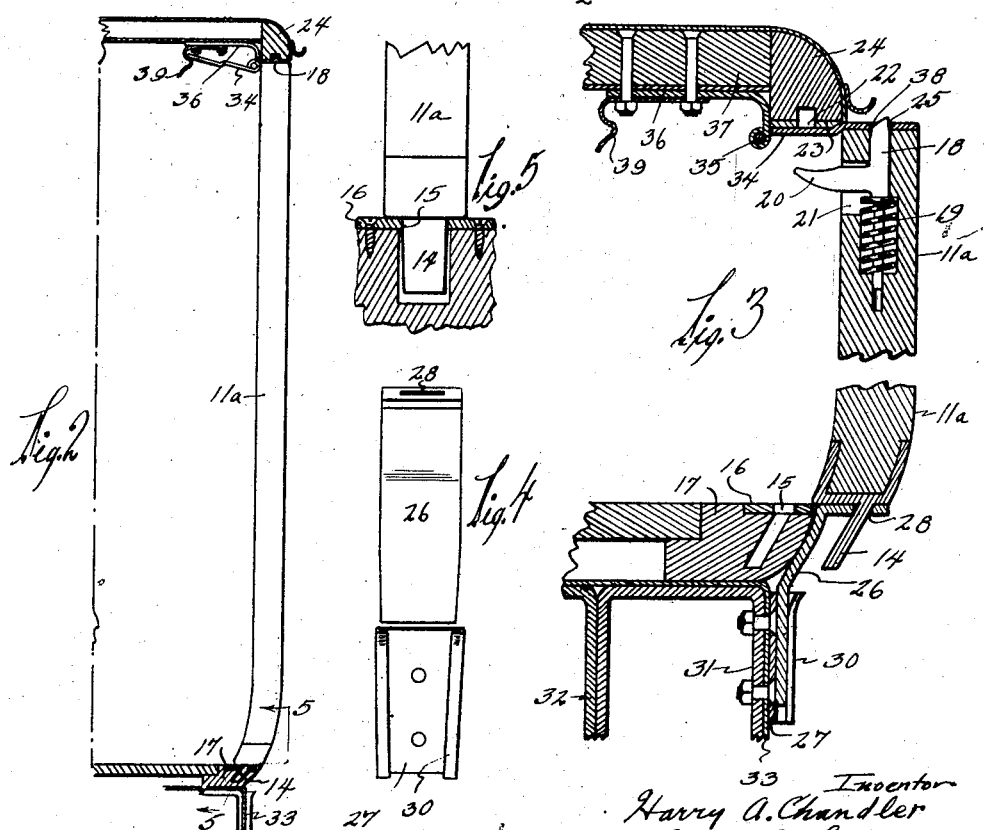
Inventor
Harry A. Chandler
By Lynn R. Latta Attorney

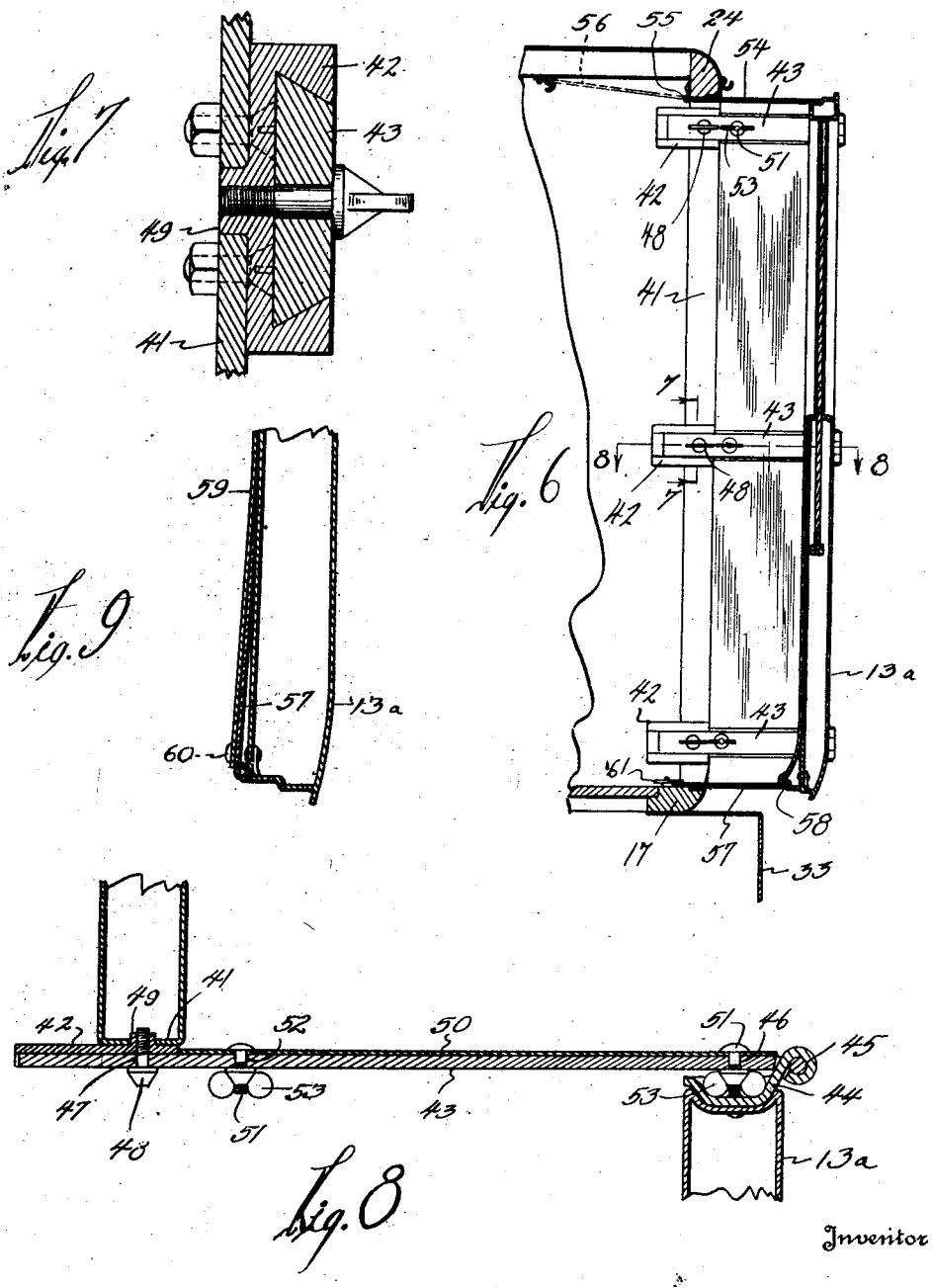

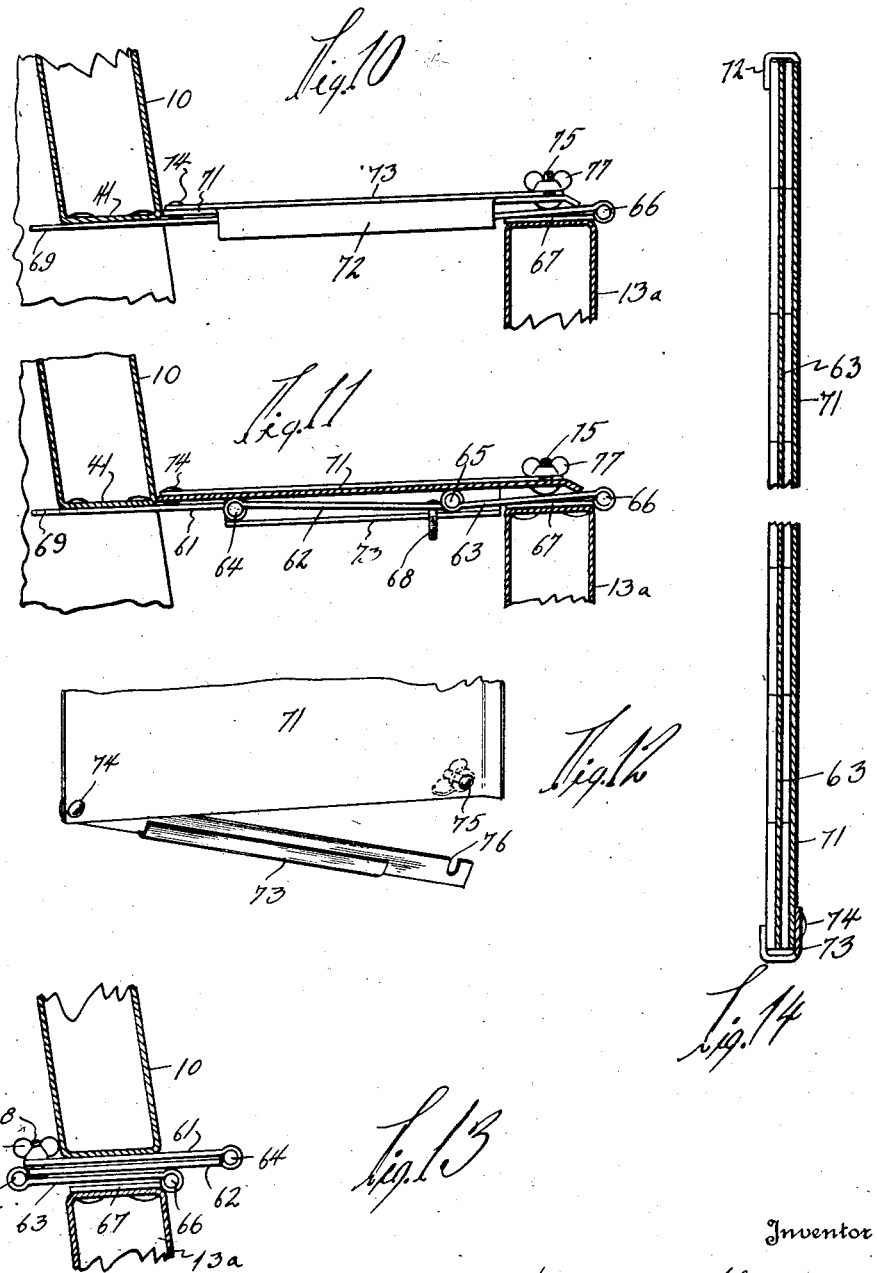

Patented May 10, 1927.

1,627,833

UNITED STATES PATENT OFFICE.

HARRY A. CHANDLER, OF SIOUX CITY, IOWA.

CONVERTIBLE PASSENGER VEHICLE AND CASKET COACH.

Application filed October 25, 1926. Serial No. 143,983.

My invention has for its object to provide a vehicle that may be readily converted from a passenger vehicle into a casket coach.

More specifically, it is my object to provide a vehicle having only the normal length of a passenger vehicle, but adaptable to receive a casket, the preparation for the casket being accomplished by the removal of a portion of the front seat and the extension of the forward portion of one side of the vehicle to a plane equidistant at all points from the longitudinal axis of the vehicle. I find that a simple method of obtaining this extension is by extending that portion of the vehicle which includes two doors and a post separating them.

A further object of the invention is to mount the forward adjustable door in such a way that it may be adjusted from one position to the other without removing its hinged connection with the vehicle. This may be done either by providing hinges having portions slidable relative to the front post of the vehicle or by providing hinges having triple joint construction, allowing them to be collapsed or extended.

Another object of the invention is to provide means for quickly setting the post which separates the doors, to its extended position.

My invention further relates in providing means for quickly inclosing the space left between the doors and the sides of the vehicle to form a complete, inclosed, extended compartment.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 1 is a horizontal, sectional view taken through a vehicle body embodying my invention.

Fig. 2 is a vertical, sectional view taken on the line 2—2 of Fig. 1.

Fig. 3 is a detail, sectional view taken vertically through the upper and lower portions of the post in its extended position.

Fig. 4 shows perspectively the post extension bracket and the socket by means of which it is secured to the vehicle.

Fig. 5 is a sectional view taken on the line 5—5 of Fig. 2.

Fig. 6 is a vertical, sectional view taken as indicated by the line 6—6 of Fig. 1, illustrating the forward door in its extended position.

Fig. 7 is a detail, sectional view taken on line 7—7 of Fig. 6.

Fig. 8 is a detail, sectional view taken on line 8—8 of Fig. 6.

Fig. 9 is an enlarged, detail, sectional view taken vertically through the lower end of the forward door and illustrating the lower cover flap in its normal position inclosed within the door.

Fig. 10 is a detail, perspective view similar to Fig. 8 but showing a modification of the front door hinge construction.

Fig. 11 is a similar view illustrating the cover plate in section.

Fig. 12 is a perspective view of the lower end of the cover plate.

Fig. 13 is a sectional view similar to Fig. 9 showing the modified hinge in collapsed position, and Fig. 14 is a vertical, sectional view through the modified hinge.

I am aware that it is not new to provide a casket coach in which a casket may be loaded from the side. The primary object of my invention, however, is to render an ordinary passenger vehicle, convertible so that the funeral director in the smaller establishment need not tie up his money in a casket coach which, most of the time, is not in use, but may drive the vehicle every day as a passenger or pleasure car.

In order to accommodate a casket in the ordinary passenger car, it must be extended beyond the back of the front seat since the ordinary passenger vehicle is not as long as the average casket coach. Width of the forward end of the passenger vehicle, however, is not sufficient to accommodate a casket and leave room for the driver of the vehicle. Accordingly, my invention contemplates the extending of the two side doors to a position parallel to the longitudinal axis of the car.

I have used the reference character 10 to indicate generally the vertical walls of a vehicle shown in section in Fig. 1. These walls include the post 11 on the left hand side of the vehicle, which separates the usual doors 12 and 13. On the right hand side of the vehicle the doors 12$^a$ and 13$^a$ are separated by a post 11$^a$ which is provided with a tongue 14 at its lower end, wedge shaped in elevation and received in a slot 15 in a plate 16 secured to the sill 17 of the vehicle body. At its upper end the post 11$^a$ is provided with a sliding bolt 18 normally held in an upper position in which its end projects beyond the end of the post, by a spring 19 and provided with an inwardly extending finger 20 slidably extended through a slot 21, the finger serving as a means by which the bolt 18 may be retracted.

The bolt 18 normally extends through a slot 22 in a plate 23 secured to the upper sill 24 of the vehicle body. The bolt 18 is also bevelled at the upper extremities of its sides as at 25 and the spring 19 is of sufficient power to urge the bolt 25 securely into engagement with the sides of the slot 22.

It will now be seen that this spring pressure will not only wedge the bolt 25 securely in contact with the upper sill of the vehicle but will cause a downward pressure serving also to wedge the tongue 14 into secure engagement with the plate 16, thereby eliminating any tendency of the post to rattle when the vehicle is in motion.

When it is desired to extend the post, the bolt 18 is retracted, the upper end of the post swung outwardly to clear the sill 24 and the tongue 14 then lifted from the slot 15. A bracket 26, normally carried in the tool box is then inserted in a socket 27 designed to receive it and the tongue 14 is inserted in a slot 28 in the bracket 26 which is identical in shape to the slot 15. The lower end of the bracket 25 which is received in the socket 27 has its sides inclined as at 29 and the socket 27 is provided with side channel members 30 which are also inclined to fit the inclined sides 29. The socket 27 is secured to the bracket 31, which in the ordinary vehicle, is secured to the chassis member 32 and supports the apron 33.

I provide an arm 34 hinged at 35 to a plate 36 secured to the rafter 37 of the vehicle top and adapted to be moved to the position shown in Fig. 3. The free end of the arm 34 is offset in a direction to compensate for its thickness in receiving the upper end of the post 11$^a$. This function is thought to be obvious in Fig. 3. This offset end of the arm is provided with a slot 38 similar to the slot 22 in dimension to receive the bolt 18. When the arm 34 is not in use it is held by a spring clip 39 secured to the plate 36 (Fig. 2). By referring to Fig. 1, it will be noted that the hinge of the rear door 12$^a$ need not be extended since the vehicle at this point is sufficiently wide to accomodate the casket. (The latter is shown in dotted lines in Fig. 1 and indicated by the reference character 40).

The means for extending the front hinge is shown in Figs. 6, 7, and 8. To the forward post 41 of the forward door opening are secured a plurality of guide channel blocks 42 which receive the arms 43 of the hinges. The arms 43 are provided with bevelled edges as shown to fit within the channel blocks 42. At their outer ends the arms 43 form, together with the short arms 44, hinged at 45 to the arms 43, hinges for supporting the door. A pair of openings 46 and 47, respectively, are provided on each arm 43 and when the hinges are in their normal positions relative to the vehicle body, they are secured to the post 41 by means of thumb screws 48 extended through the openings 46 and threaded into bosses 49 formed in the blocks 42. When the hinges are in their extended positions shown in Fig. 8, the thumb screws 48 are received through the openings 47 and thence threaded into the bosses 41. The short arms 44 of the hinges are cupped as shown in Fig. 8 in order to receive the thumb screw 48 when the hinges are in normal position to allow the doors to close. It will be understood that the short arms 44 are secured permanently to the door.

When the door is in extended position, a cover plate 50 is secured to the forward faces of the hinge arms 43 by means of studs 51 permanently carried by the plates 50 extended through openings 52 and 46, respectively, in the arms 43 and secured by thumb nuts 53. The cavities 44 serve to receive the thumb nuts 53 as well as the thumb screws 48.

The space between the upper edge of the door and the car is closed by an upper cover flap 54 hinged at 55 to the upper sill 24, at the inner corner of the sill and adapted to be moved from the dotted line position shown at 56 in Fig. 6 to the full line position in which its outer extremity is received over the upper edge of the door. It will be noted that the flap 54 is thus securely held between the upper edge of the door which prevents downward movement and the face of the sill 24 which prevents upward movement.

The space between the lower edge of the door and the sill 17 is closed by a flap 56, hinged at 58 to the door and adapted to be received against the sill 17. When not in use, the flap 57 is received within the door, the inner fabric covering 59 thereof, being removable at its lower extremity and secured to the ordinary frame of the door or to the flap 57 as shown in Fig. 9 by means of buttons 60.

Spring buttons 61 may be provided to prevent rattling of the lower flaps 57 or may be dispensed with as described.

In connection with the upper flap, it may be mentioned that in order to insert it above the door it is necessary to slide the door slightly beyond the position shown in Fig. 6, to then raise the flap shown in Fig. 6 and thence return the door to its extended position receiving the flap thereabove.

A modification of the hinge structure is shown in Figs. 10 to 14, inclusive. In this modification, the same type of upper and lower flaps may be used to cover the upper and lower spaces in the vehicle body and these have therefore not been illustrated. Instead of slidably connecting the hinge with the post 41 I form it in three sections—61, 62, and 63 which are hinged together at 64 and 65 and to the door at 66, a short arm 67 being provided for this purpose. In the drawings, I have shown the hinge structure as extending continuously from the upper to the lower edge of the door but it will be understood that a plurality of hinges such as shown in Fig. 6 may be employed, each embodying the triple hinge sections (although the hinge actually comprises four sections when the arm 67 is considered it is obvious that the section 63 might be hinged to the door in some other manner than by means of a short arm 67, for instance, by forming the hinge portion integrally with the door). For this reason, the hinge will be referred to as comprising three sections.

The pivots 64, 65 and 66 are so spaced from each other that the hinge may be collapsed to the position shown in Fig. 13, the pivot 65 projecting beyond the inner surface of the body and the pivot 66 being brought to such a position that the door will hinge normally relative to the post 41 upon the pivot 66. The three hinge sections 61, 62, and 63 are thence secured to the post 41 by any suitable means such as for instance, the stud 68 secured to the section 62 in the proper position to be received through a projecting ear 69 on the hinge section 61 and to thence receive a thumb nut 70 to secure it to the ear 69.

It will now be seen that by projecting the pivot 65 beyond the inner surface of the vehicle body, the pivot is not only removed from between the door and the post 31 in order to allow a snug fit between the door and post as is possible but also allows the securing of the sections 61, 62 and 63 to the post as just described.

A cover plate for the hinge serves not only the function of excluding air currents as does the cover plate 50 but serves also to lock the three sections 61, 62 and 63 in substantial alignment with each other. This cover plate is shown in Figs. 10, 11 and 12 and 14 and comprises generally a plate 71 provided at its upper edge with an integral downwardly bent flange 72 and at its lower edge with a channel bar 73 pivoted to fit at 74. The channel bar 73 may be secured to the plate 71 to form a flange similar to the flange 72, by means of a stud 75 secured to the plate and adapted to be received by a slot 67 in the end of the bar 73, the latter being secured by a thumb nut 77.

It will now be seen that by hooking the flange 72 over the upper edges of the sections 61, 62 and 73 and moving the channel member 73 downwardly that the lower surface of the plate may be brought flush against the pivots 64 and 65 in the same vertical plane with the upper portion thereof and the channel 73 thence moved upwardly to engage the lower extremities of the pivots 64 and 65 and thereby lock the plate securely in position.

The gear shift lever 78 shown in Fig. 1 may be bent toward the steering wheel 79 in order to provide room for the forward end of the casket and to enable the operator to still grasp the lever. The front seat and rear seat back cushion are slit to provide the removable portions 80 and 81, respectively, in order that the casket 40 may be inserted within the vehicle.

The advantages of my invention are thought to be obvious. The cost of a hearse is eliminated where the funeral director must own a passenger vehicle. My invention adds very little to the cost of a passenger vehicle itself. The change from passenger vehicle to hearse may be accomplished very rapidly and with very little trouble. The parts are adapted to eliminate, as far as possible, any rattling of that side of the vehicle which is extensible.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. A convertible vehicle body, having a normal width at its forward extremity which is less than the width at its rear extremity, a pair of doors hinged in one side of said body, a post separating the doors, the doors and post being movable to bring them into a common plane parallel to the longitudinal axis of the body and aligned with the widest portion of the side wall of the vehicle.

2. A convertible vehicle body, having a normal width at its forward extremity which is less than the width at its rear extremity, a pair of doors hinged in one side of said body, a post separating the doors, the doors and post being movable to bring them into a common plane parallel to the longitudinal axis of the body and aligned with the widest portion of the side wall of the vehicle, and means for supporting the post in its extended position.

3. A convertible vehicle body, having a normal width at its forward extremity which is less than the width at its rear extremity, a pair of doors hinged in one side of said body, a post separating the doors, the doors and post being movable to bring them into a common plane parallel to the longitudinal axis of the body and aligned with the widest portion of the side wall of the vehicle, and means for extending the hinges of one of the doors to position their pivot axis in said common plane.

4. A convertible vehicle body, having a normal width at its forward extremity which it less than the width at its rear extremity, a pair of doors hinged in one side of said body, a post separating the doors, the doors and post being movable to bring them into a common plane parallel to the longitudinal axis of the body and aligned with the widest portion of the side wall of the vehicle, means for extending the hinges of the forward door and means for supporting the post in its extended position.

5. A convertible vehicle body, having a normal width at its forward extremity which is less than the width at its rear extremity, a pair of doors hinged in one side of said body, a post separating the doors, the doors and post being movable to bring them into a common plane parallel to the longitudinal axis of the body and aligned with the widest portion of the side wall of the vehicle, and a flap for covering the space between the lower edge of one of the doors when said door is in extended position, and the sill of the body.

6. A convertible vehicle body, having a normal width at its forward extremity which is less than the width at its rear extremity, a pair of doors hinged in one side of said body, a post separating the doors, the doors and post being movable to bring them into a common plane parallel to the longitudinal axis of the body and aligned with the widest portion of the side wall of the vehicle, and a flap for covering the space between the lower edge of one of the doors when said door is in extended position, and the sill of the body, said flap being hinged to the lower extremity of the door and adapted to be received within the door when not in use.

7. A convertible vehicle body, having a normal width at its forward extremity which is less than the width at its rear extremity, a pair of doors hinged in one side of said body, a post separating the doors, the doors and post being movable to bring them into a common plane parallel to the longitudinal axis of the body and aligned with the widest portion of the side wall of the vehicle, and a flap for covering the space between the upper edge of one of the doors when in extended position, said flap being hinged to the upper body sill and adapted to be received above the upper edge of the door when the latter is extended.

8. A convertible vehicle body, having a normal width at its forward extremity which is less than the width at its rear extremity, a pair of doors hinged in one side of said body, a post separating the doors, the doors and post being movable to bring them into a common plane parallel to the longitudinal axis of the body and aligned with the widest portion of the side wall of the vehicle, one of the doors being provided with extensible hinges, and a cover plate adapted to be secured to said hinges when in extended position.

9. In combination with a vehicle body having upper and lower sills provided with slotted cavities, a post having protruding elements comprising a tongue at one end received in one of the cavities, a spring-urged bolt received in the other cavity, said bolt being retractable to allow removal of the post, and a slotted arm hinged to one of the sills adapted to be swung to a horizontal position extending outwardly beyond the sill and to there receive one of the protruding elements.

10. In combination with a vehicle body having upper and lower sills provided with slotted cavities, a post having protruding elements comprising a tongue at one end received in one of the cavities, a spring-urged bolt received in the other cavity, said bolt being retractable to allow removal of the post, a bracket having a slotted arm to receive one of said protruded elements and a socket secured to the vehicle body to receive another arm of said bracket.

Signed this 15th day of October, 1926, in the county of Woodbury and State of Iowa, at Sioux City.

HARRY A. CHANDLER.